United States Patent [19]

Yamada

[11] Patent Number: 5,296,888
[45] Date of Patent: Mar. 22, 1994

[54] SIGHT AXIS DETECTION APPARATUS
[75] Inventor: Akira Yamada, Yokohama, Japan
[73] Assignee: Canon Kabushiki Kaisha, Tokyo, Japan
[21] Appl. No.: 45,688
[22] Filed: Apr. 14, 1993
[30] Foreign Application Priority Data
  Apr. 20, 1992 [JP] Japan .................. 4-126856
[51] Int. Cl.⁵ .......... G03B 7/08; G03B 13/36; G03B 13/02
[52] U.S. Cl. .............. 354/402; 354/432; 354/219
[58] Field of Search ........ 354/400, 402, 429, 432, 354/62, 219, 202
[56] References Cited
FOREIGN PATENT DOCUMENTS
61-61135 3/1986 Japan .
1-241511 9/1989 Japan .
1-274736 11/1989 Japan .

Primary Examiner—W. B. Perkey
Attorney, Agent, or Firm—Fitzpatrick, Cella, Harper & Scinto

[57] ABSTRACT

An apparatus comprising a sight axis detection means for detecting a sight axis direction of a photographer who looks into a finder field, a focus detection means for detecting focus adjustment states in a plurality of areas in the finder field, and a photometry means for measuring luminances of a plurality of areas in the finder field, which causes a selection means to select an area to be subjected to a distance measuring operation on the basis of signals from the sight axis detection means and the photometry means, and performs focus detection of an objective lens on the basis of a focus detection signal from the focus detection means in the area selected by the selection means.

10 Claims, 11 Drawing Sheets

SIGHT AXIS DETECTION APPARATUS

BACKGROUND OF THE INVENTION

1. Field of the Invention

The present invention relates to a camera having a focus detection means and a sight axis detection means and, more particularly, to an apparatus suitably used for a still camera, a video camera, an SV camera, and the like upon adjustment of a focusing state of a photographing system by selecting one of a plurality of in-focus signals obtained by the focus detection means having a function of detecting focusing states on a plurality of areas of an object.

2. Related Background Art

Conventionally, there have been proposed various cameras, in each of which an area in a finder field observed by a photographer, i.e., a so-called view direction of the photographer is detected by a sight axis detection means provided to a portion of a camera, and various photographing functions such as an auto-focusing function, an auto-exposure function, and the like are controlled on the basis of a signal from the sight axis detection means.

For example, Japanese Laid-Open Patent Application No. 61-61135 proposes a camera, which adjusts the focusing state of a photographing system by mechanically controlling the distance measuring direction of a focus detection device on the basis of an output signal from a sight axis detection means.

Also, the present applicant proposes, in Japanese Laid-Open Patent Application No. 1-241511, a camera, which comprises a sight axis detection means for detecting the view direction of a photographer, a focus detection means having a plurality of distance measuring fields, and an auto-exposure control means having a plurality of photometry sensitivity distributions, and controls the driving operations of the focus detection means and the auto-exppsure control means on the basis of an output signal from the sight axis detection means.

In a conventional camera, photographing conditions for focus adjustment, exposure control, and the like are automatically set with reference to the central area in the finder field. In contrast to this, in the camera proposed by this patent, an arbitrary area (many areas in some cases) in the finder field is selected on the basis of a photographer's choice, and focus adjustment, exposure control, and the like are performed with reference to the selected area. Thus, one of the most important factors in image formation can be selected independently of automatic control methods, and a photographing operation can be performed under the desired conditions intended by a photographer.

In general, the movement of the sight axis of the photographer who observes the finder field is complex, and the sight axis position observed by the photographer does not always correspond to a main object, i.e., a distance measuring area to be focused.

For example, a photographer's attention is drawn to an especially bright object (having a high luminance) near the periphery of the frame, and the photographer may instantaneously observe the object.

In this case, when an auto-focusing operation is performed with reference to a distance measuring area selected on the basis of the sight axis information of the photographer, the driving operation of a focusing lens is very complicated, and the focusing state frequently changes (in particular, in a single-lens reflex camera).

As a result, a finder image cannot easily be observed, and the camera cannot be focused on the main target object.

SUMMARY OF THE INVENTION

It is an object of the present invention to provide a camera comprising a focus detection means and a sight axis detection means, wherein whether or not one area in a finder field obtained based on the sight axis detection means is a main object intended by a photographer is discriminated by utilizing a signal from a photometry means. This signal for performing photometry operations of a plurality of areas is chosen so as to specify the main object intended by the photographer with high probability. Further, distance measuring information is obtained from the focus detection means in association with the main object, thereby obtaining a good image.

According to one aspect of the present invention, a camera comprises a sight axis detection means for detecting the view direction of a photographer who looks into a finder field of the camera, a focus detection means for detecting focusing states of an objective lens in a plurality of areas in the finder field, and a photometry means for performing photometry operations of a plurality of fields in the finder field of the objective lens, wherein an area to be subjected to a distance measuring operation is selected by a selection means on the basis of signals from the sight axis detection means and the photometry means, and focus adjustment of the objective lens is performed on the basis of the focusing state of the selected area.

In particular, according to the present invention, an area in the finder field is selected only when the area has a luminance within a predetermined range. The camera also comprises a calculation means for determining the driving amount of a focusing lens of the objective lens on the basis of a focusing state signal associated with an area selected by the selection means from the focusing state signals of the plurality of areas obtained by the focus detection means.

DETAILED DESCRIPTION OF THE PREFERRED EMBODIMENTS

Figure 1:
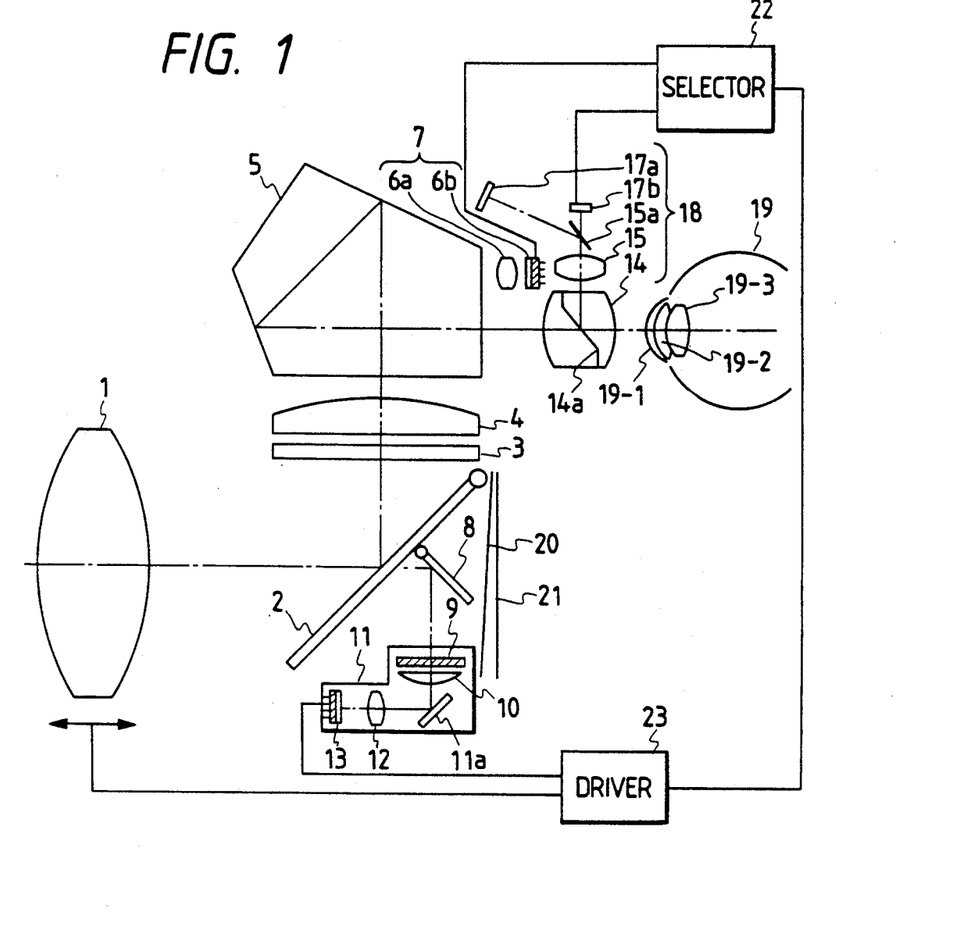
FIG. 1 is a schematic diagram showing a main part of an optical system according to the first embodiment of the present invention.
Figure 2:
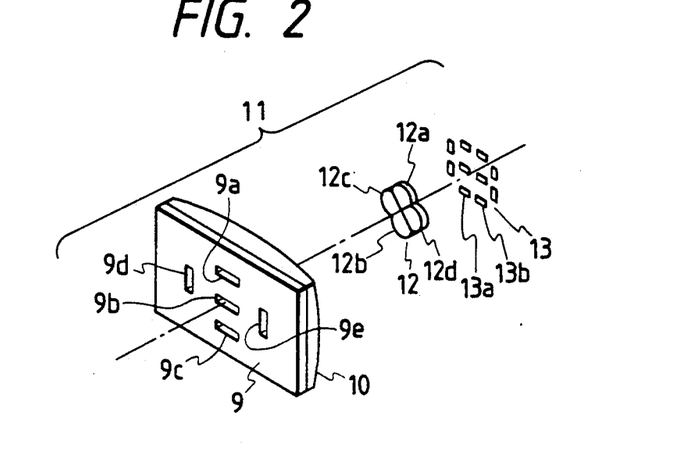
FIG. 2 is a partial explanatory view of FIG. 1.
Figure 3A:
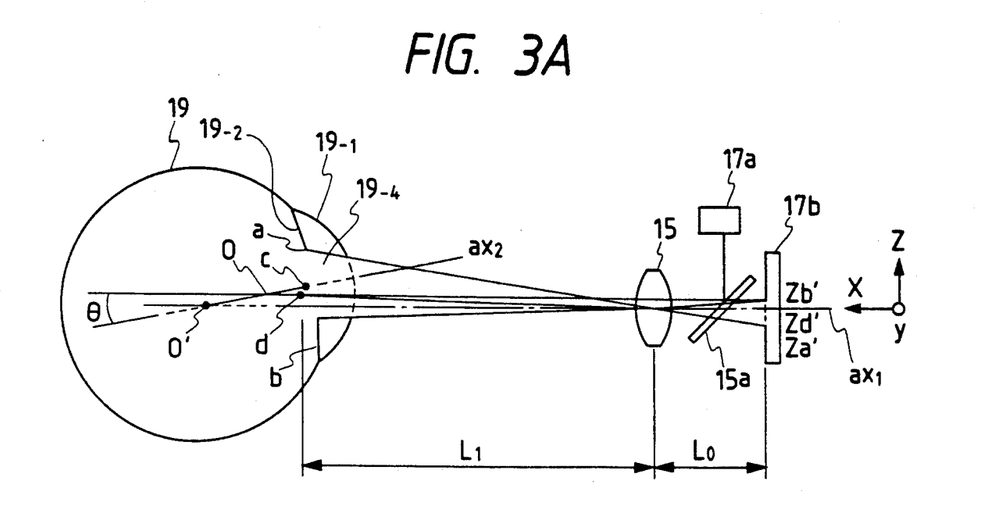
FIGS. 3A and 3B are views for explaining the principle of a sight axis detection method according to the present invention.
Figure 3B:
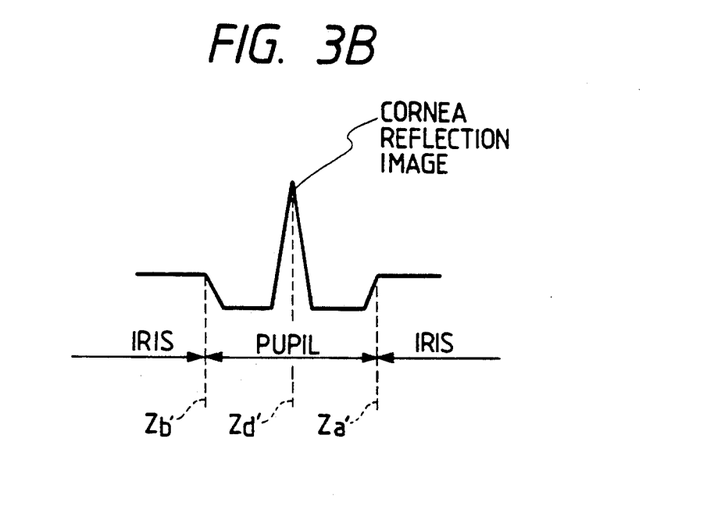

FIG. 1 is a schematic diagram of an optical system according to a first embodiment in which the present invention is applied to a single-lens reflex camera. FIG. 2 is a partial perspective view showing a main part of an auto-focus device shown in FIG. 1. FIG. 3A is a view for explaining the principle of a sight axis detection method according to the present invention. FIG. 3B is an explanatory view of the output intensity from an image sensor shown in FIG. 3A.

In FIG. 1, a dichroic mirror 14a, which transmits visual light and reflects infrared light, is obliquely arranged in an eyepiece lens 14. The eyepiece lens 14 also serves as a beam splitter. An illumination means 17a comprises a light-emitting diode for emitting, e.g., infrared light undetectable by an observer. An image sensor 17b constitutes a light-receiving means together with a light-receiving lens 15.

The image sensor 17b is constituted by one- or two-dimensional arrays of photo-electric elements, and is arranged at a position conjugate with a position near the pupil of an eyeball 19 located at a predetermined position with respect to the light-receiving lens 15 and the eyepiece lens 14. A half mirror 15a is arranged between the image sensor 17b and the light-receiving lens 15.

The components 14, 15, 15a, 17a, and 17b constitute a sight axis detection means 18 for detecting the sight axis of the eyeball 19.

A photographing system includes a photographing lens 1, a quick return (QR) mirror 2, a focusing screen 3 on which a finder image is formed, a condenser lens 4, a pentagonal roof prism 5, a photometry converging lens 6a, and a photometry element 6b. The converging lens 6a and the photometry element 6b constitute a photometry means 7.

The photometry means 7 divides a finder field on the focusing screen 3 into a plurality of areas, and measures the luminances (brightnesses) of these areas. The photographing system also includes a shutter 20, a photosensitive surface 21, a sub mirror 8 provided to a portion of the QR mirror 2, and a focus detection means 11.

The focus detection means 11 has a field mask 9, a field lens 10 arranged near a prospective focal plane of the photographing lens 1, a mirror 11a, a secondary image formation lens 12, and a photo-electric conversion element 13, and performs focus detection of a plurality of areas in a photographing frame by a known method.

The focus detection means 11 will only be briefly described below since it is a known device. More specifically, in this embodiment, as shown in FIG. 2, the field mask 9 arranged near the prospective focal plane of the photographing lens 1 and having a plurality of slits ($9a$ to $9e$) for respectively determining distance measuring areas, and the lens member 10 for providing a field lens effect for images in the slits are arranged adjacent to each other.

The field mask 9 prevents light beams from areas outside the distance measuring areas from being incident on the sensor (photo-electric conversion element) 13, and the lens member 10 defines a substantially conjugate relationship between the exit pupil of the photographing lens 1 and the entrance pupil of the secondary image formation lens 12.

In FIG. 2, a set of secondary image formation lenses 12 and a set of photo-electric element arrays 13 corresponding in number to the slits are sequentially arranged.

In FIG. 2, the field mask 9 near the prospective focal plane has the five distance measuring fields (slits) $9a$ to $9e$, and known focus detection systems are arranged in correspondence with these fields. For example, an image formation light beam passing through a rectangular aperture of the distance measuring field $9a$ in FIG. 2 is deflected by the field lens 10, and is incident on a pair of secondary image formation lenses $12c$ and $12d$.

A field stop (not shown) is arranged in front of the secondary image formation lenses 12. A light beam transmitted through the secondary image formation lens $12c$ re-forms an optical image of the field $9a$ on a photo-electric element (sensor) array $13a$. On the other hand, a light beam transmitted through the secondary image formation lens $12d$ re-forms an optical image of the field $9a$ on a photo-electric element array $13b$. A correlation between the object images formed on the two photo-electric element arrays $13a$ and $13b$ is calculated, thereby detecting the focusing state in the field $9a$ of the photographing lens 1.

In FIG. 2, the focusing states in the plurality of distance measuring areas $9a$ to $9e$ in the finder field are detected by the above-mentioned method. Since an image of the field stop (not shown) near the secondary image formation lenses is re-formed on the exit pupil of the photographing lens 1 by the field lens 10, the above-mentioned optical system consequently constitutes a known so-called split pupil focus detection means 11.

The arrangement of the sight axis detection means 18 in this embodiment will be described below.

FIG. 3A is a schematic view when the optical path of the sight axis detection means 18 is developed.

In FIG. 3A, the light source (illumination means) 17a comprises, e.g., a light-emitting diode for emitting infrared light undetectable by an observer, and is arranged on the focal plane of the light-receiving lens 15.

Infrared light emitted from the light source 17a is collimated into parallel light by the light receiving lens 15 via the half mirror 15a, is reflected by a half mirror surface 14a (not shown), and illuminates a cornea 19-1 of the eyeball 19. At this time, a cornea reflection image (virtual image) d defined by some light components of the infrared light reflected by the surface of the cornea 19-1 is converged by the light-receiving lens 15, and is re-formed at a position Zd' on the photo-electric element array (image sensor) 17b.

Light beams from edge portions a and b of an iris 19-2 form images of the edge portions a and b at positions Za' and Zb' on the photo-electric element array 17b via the light-receiving lens 15. When a rotational angle $\theta$ as an angle defined between the optical axis (optical axis $ax_1$) of the light-receiving lens 15 and an optical axis $ax_2$ of the eyeball is small, if the z-coordinates of the edge portions a and b of the iris 19-2 are represented by Za and Zb, a coordinate Zc of a central position c of a pupil 19-4 is expressed by:

$$Z_c \approx (Z_a + Z_b)/2$$

Since the coordinate of the cornea reflection image d coincides with the z-coordinate of a center O of curvature of the cornea 19-1, if the z-coordinate of the cornea reflection image generation position d is represented by Zd, and the distance from the center O of curvature of the cornea 19-1 to the center C of the pupil 19-4 is represented by $L_{OC}$, the rotational angle $\theta$ as the angle defined between the eyeball optical axis $ax_2$ and the optical axis $ax_1$ substantially satisfies:

$$L_{OC} \cdot SIN\theta \approx Z_c - Z_d \quad (1)$$

For this reason, when the positions of specific points (the cornea reflection image d and the edge portions a and b of the iris) projected onto the photo-electric element array 17b are detected, as shown in FIG. 3B, a calculation means can calculate the rotational angle $\theta$ of the optical axis $ax_2$ of the eyeball 19. In this case, relation (1) is rewritten as:

$$\beta \cdot L_{OC} \cdot SIN\theta \approx (Z_a' + Z_b')/2 - Z_d' \quad (2)$$

where $\beta$ is the magnification determined by a distance L1 between the cornea reflection image generation position d and the light-receiving lens 15, and a distance LO between the light-receiving lens 15 and the photo-electric element array 17b.

The optical axis $ax_2$ of the eyeball of the observer does not coincide with his or her sight axis. Japanese Laid-Open Patent Application No. 1-274736 discloses a technique for detecting the sight axis by correcting an angle between the optical axis of the eyeball and the sight axis of the observer. In this technique, a horizontal rotational angle $\theta$ of the optical axis of the eyeball of the observer is calculated, and when an angle correction value between the optical axis of the eyeball and the sight axis is represented by $\delta$, a horizontal sight axis $\theta H$ of the observer is given by:

$$\theta H = \theta \pm \delta \quad (3)$$

where if the clockwise rotational angle with respect to the observer assumes a positive value, when the observer looks into the observation device with his or her left eye, "+" of the double sign "±" is selected; when the observer looks with his or her right eye, "−" is selected.

In this embodiment, a selector 22 selects an area to be subjected to a distance measuring operation (distance measuring area) in the finder field on the basis of signals from the sight axis detection means 18 and the photometry means 7, and a driving means 23 performs an auto-focusing operation by obtaining one of a plurality of in-focus signals detected by the focus detection means 11 on the basis of the signal (distance measuring area) selected by the selector 22. An arrangement for achieving these operations will be described below.

Figure 4:
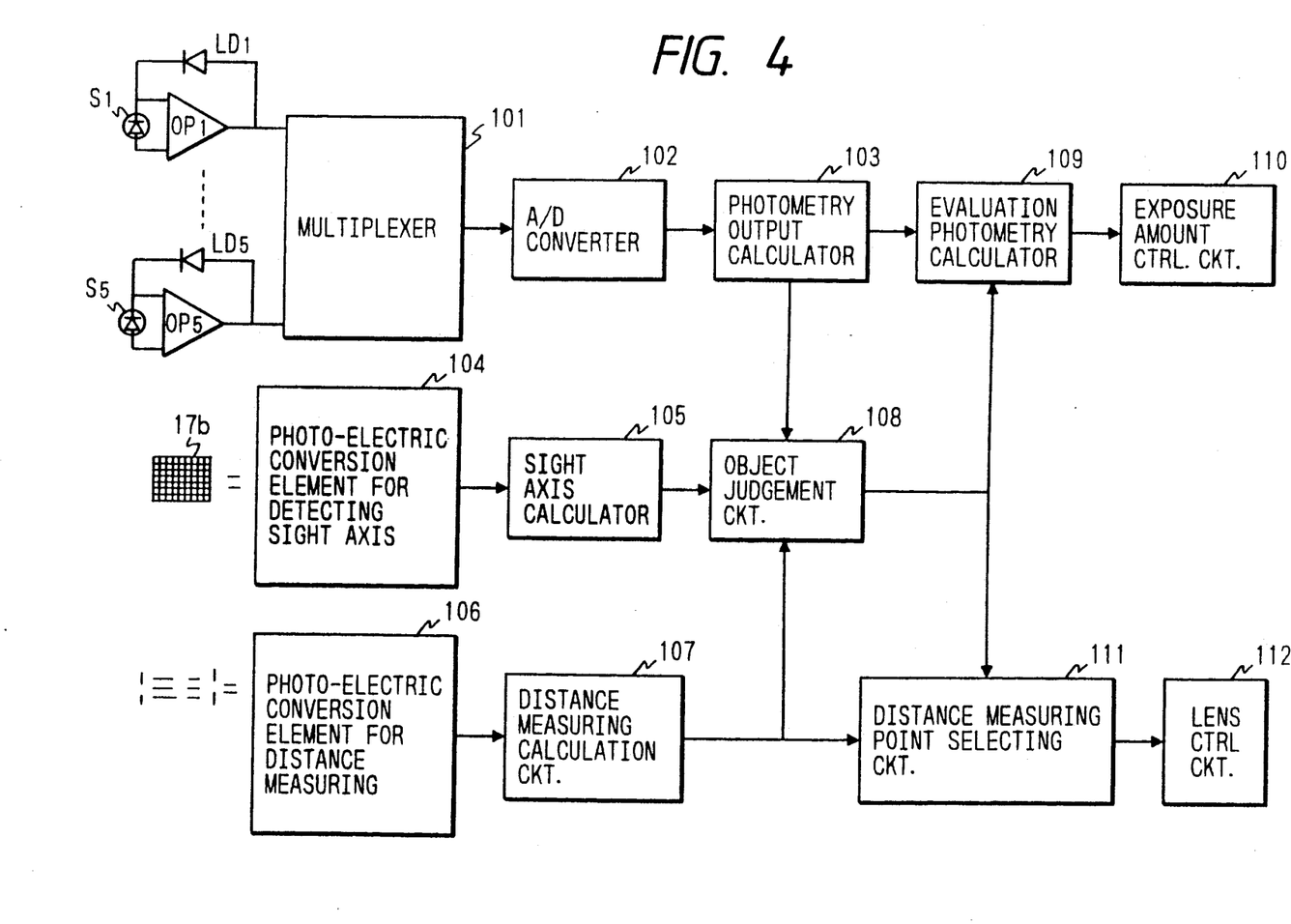
FIG. 4 is a block diagram showing a main part of the first embodiment of the present invention.

FIG. 4 is a block diagram showing an operation of the present invention.

In FIG. 4, photo-electric conversion elements S1 to S5 used in photometry operations of a plurality of areas obtained by dividing the photographing frame (finder field), logarithmic conversion elements LD1 to LD5, and operational amplifiers OP1 to OP5 constitute known photo-electric conversion circuits.

The outputs from these photo-electric conversion circuits are time-serially A/D-converted by an A/D converter 102 via a multiplexer 101, and a photometry output calculator 103 calculates photometry outputs corresponding to the photo-electric conversion elements S1 to S5.

Figure 5A:
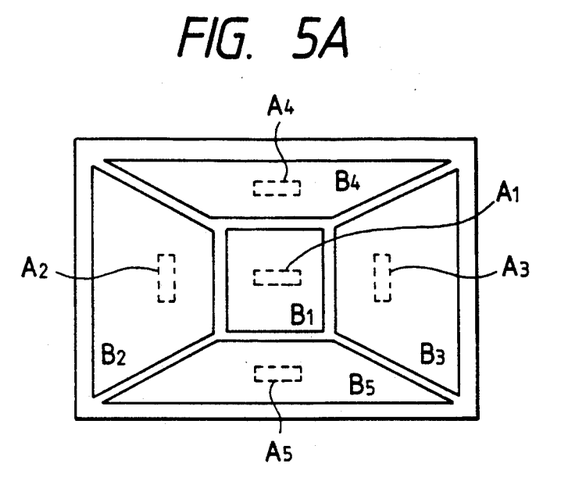
FIGS. 5A and 5B are respectively a plan view and a diagram for explaining a divisional photometry method according to the present invention.
Figure 5B:
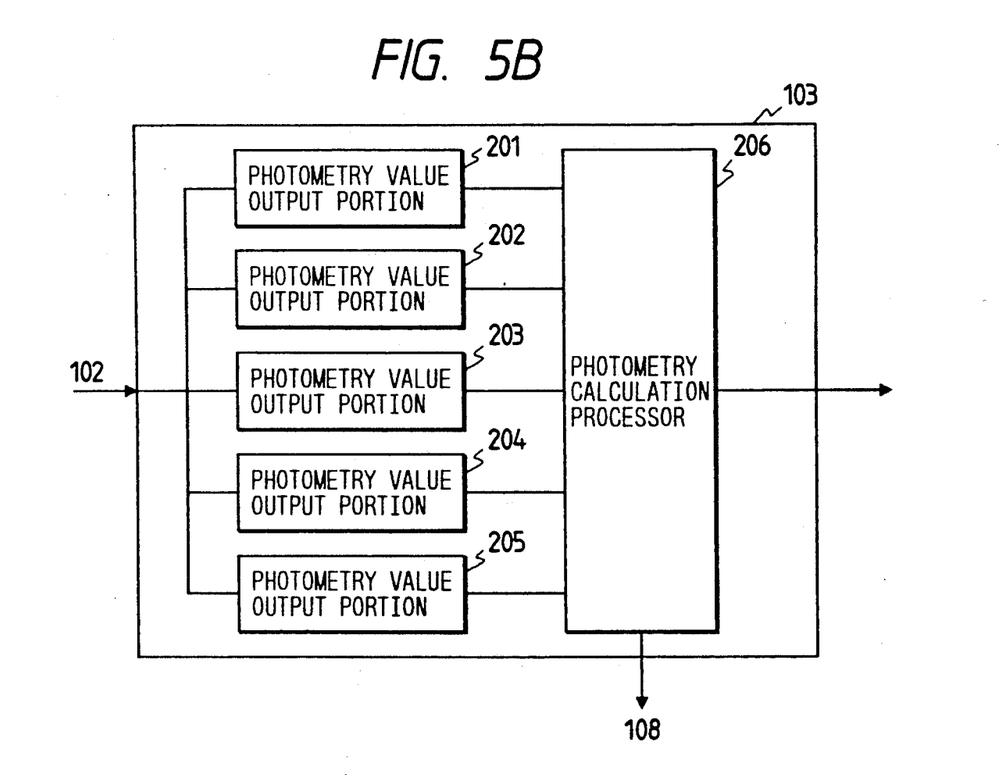

FIG. 5A shows an example of photometry areas of divided photometry portions in the photographing frame. The photometry areas consist of five photometry portions $B_1$ to $B_5$ corresponding to a plurality of distance measuring points $A_1$ to $A_5$. FIG. 5B is a block diagram showing an internal arrangement of the photometry output calculation circuit 103.

In FIG. 5B, photometry value output portions 201 to 205 correspond to the photo-electric conversion elements $S_1$ to $S_5$. A photometry calculation processor 206 calculates, e.g., an average photometry value BVA from a plurality of photometry values (BV1 to BV5) using the following equation:

$$BVA = (BV1 + BV2 + BV3 + BV4 + BV5)/5$$

The processor 206 also calculates a maximum value (BVMAX) and a minimum value (BVMIN) of the photometry values, and a luminance difference $\Delta BV1$ between these photometry calculation values using the following equation:

$$\Delta BV1 = BVMAX - BVMIN$$

The processor 206 outputs this difference as photometry information together with the photometry values.

Referring back to FIG. 4, a sight axis calculation circuit 105 calculates information from a photo-electric conversion element 104 for detecting a sight axis, which element comprises the area sensor 17b such as a CCD (FIG. 1), and outputs a sight axis position (view point).

Figure 6:
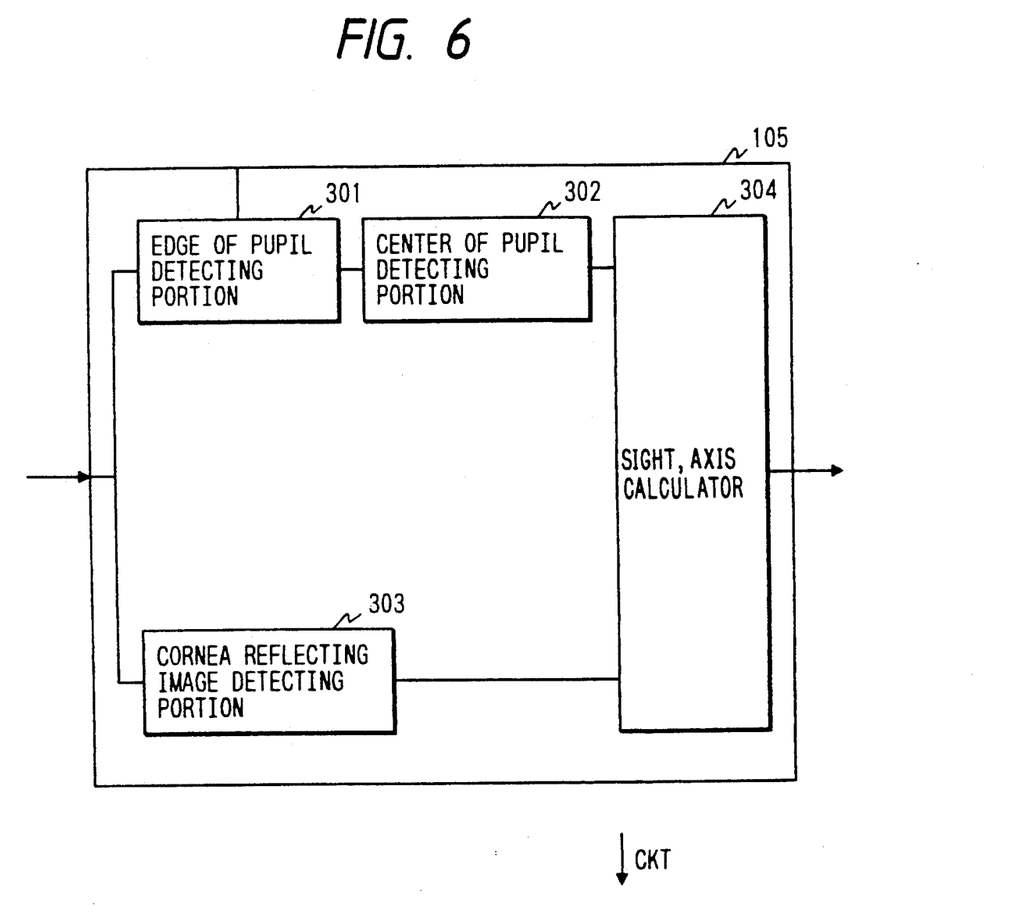
FIG. 6 is a block diagram for explaining a sight axis calculation circuit according to the present invention.

FIG. 6 is a block diagram showing an internal arrangement of the sight axis calculation circuit 105. In FIG. 6, the calculation circuit 105 comprises a pupil edge detecting portion 301 for detecting the edge portions of the pupil on the basis of information from the photo-electric conversion element 104, a center of pupil detecting portion 302 for detecting the center of pupil on the basis of an output from the pupil edge detecting portion 301, a cornea reflecting image detecting portion 303, and a sight axis calculator 304. The sight axis calculator 304 performs calculations given by relations (1) and (2) described above on the basis of the information of the center of the pupil and the information of the cornea reflecting image position, thus calculating the rotational angle $\theta$ of the eyeball of the photographer. Furthermore, the calculator 304 performs a correction between the optical axis of the eyeball and the sight axis, and finally outputs the sight axis position of the photographer. Note that such signal processing is described in detail in CFO 8474 US.

Referring back to FIG. 4, a distance measuring calculation circuit 107 calculates information from a photo-electric conversion element 106 for distance measuring, which element consists of a plurality of line sensors illustrated as the sensor 17b in FIG. 1, and outputs defocus information of each distance measuring point.

Figure 7A:
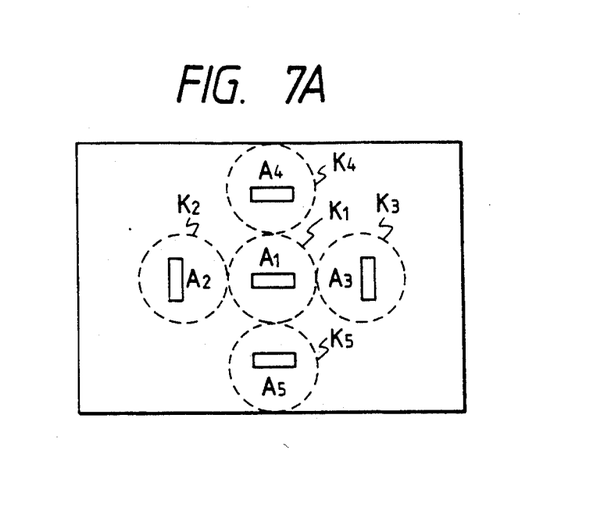
FIGS. 7A and 7B are respectively a plan view and a diagram for explaining a distance measuring calculation circuit according to the present invention.

FIG. 7A is an explanatory view showing a state wherein the focus detection means performs a multi-point distance measuring operation. As shown in FIG. 7A, the frame has five distance measuring points, and distance measuring portions $A_1$ to $A_5$ corresponding to these distance measuring points, so that the photographing lens can be focused on the object at these points.

Areas surrounding the distance measuring points correspond to sight axis field portions $K_1$ to $K_5$.

Therefore, in addition to the arrangement described above, five areas, i.e., the divided photometry areas, the multi-point distance measuring points, and the sight axis field areas are arranged in correspondence with each other in the frame.

Figure 7B:
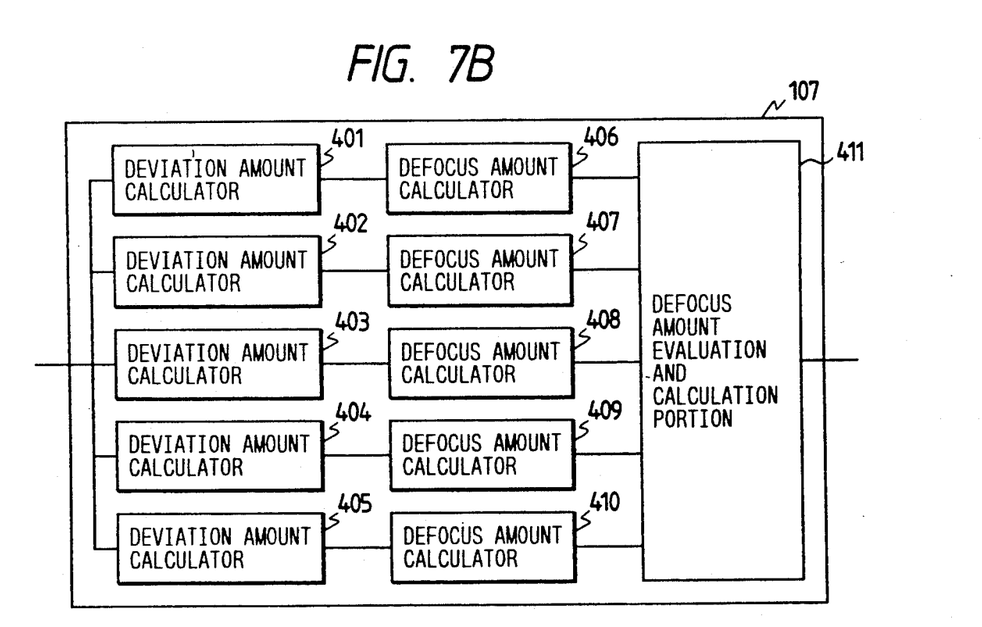

FIG. 7B is a block diagram showing an internal arrangement of the distance measuring calculation circuit 107. In FIG. 7B, the calculation circuit 107 comprises deviation amount calculators 401 to 405 each for calculating a deviation amount between two images at the corresponding distance measuring point by executing a correlation calculation based on a known distance measuring principle, defocus amount calculators 406 to 410 each for calculating the defocus amount of the photographing lens on the basis of the deviation amount output from a corresponding deviation amount calculator (401 to 405), and a defocus amount evaluation and calculation portion 411 for comparing the defocus amounts to extract distance measuring points having the same defocus amount and to extract a distance measuring point which represents a defocus amount at the closest-distance side of the closest-distance end of the photographing lens, and for outputting defocus information of the respective distance measuring points based on these pieces of information.

In FIG. 4, an object judgement circuit 108 as a selection means receives information from the above-mentioned photometry output calculation circuit 103, the sight axis calculation circuit 105, and the distance measuring calculation circuit 107, and determines an area where the object is present in the field on the basis of the judgement method to be described later. For example, the object area corresponding to the sight axis detection field is determined first on the basis of the sight axis position information. In the next sight axis detection operation, when the sight axis position changes, and it is determined that the area corresponds to an extremely bright or dark object, or an object extremely close to the closest-distance end, it is judged based on this sight axis information that the object is not changed by a photographer's choice. At this time, the previous object area information is output.

When one object area evaluated by the object judgement circuit 108 is input to an evaluation photometry calculation circuit 109, for example, when it is judged that an object is present in the sight axis detection field $K_2$, the evaluation photometry calculation circuit 109 performs a weighted evaluation calculation of the photometry values from the photometry output calculation circuit 103, so that a weighting coefficient for the photometry portion $B_2$ is increased.

At the same time, known scene judgement of the object is performed based on the average photometry value BVA and the luminance difference $\Delta BV1$, thereby correcting the photometry value to be optimal for the object. This photometry calculation value is input to an exposure amount control circuit 110 so as to provide an exposure amount optimal for the object intended by the photographer.

In addition, when the object area output from the object judgement circuit 108 is input to a distance measuring point selecting circuit 111, a distance measuring point corresponding to the input object area is selected, and the defocus amount at the selected distance measuring point is output to a lens control circuit 112 as a driving means. Thus, the lens control circuit 112 drives a focusing ring of the photographing lens to minimize this defocus amount to attain an in-focus position. Thus, the photographing lens is focused on the object intended by the photographer.

Figure 8:
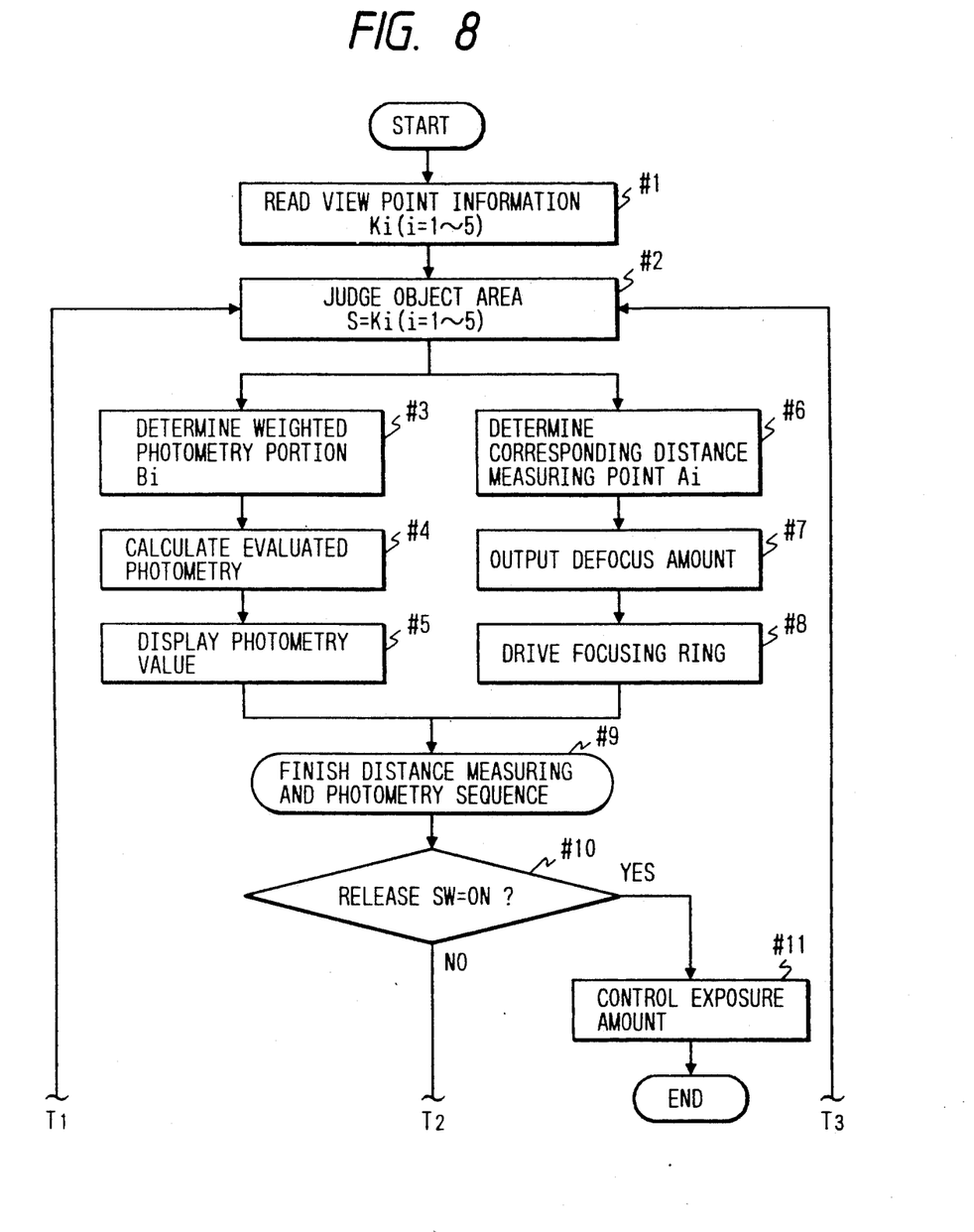
FIG. 8 is a flow chart showing an operation of an object judgement circuit according to the first embodiment of the present invention.
Figure 9:
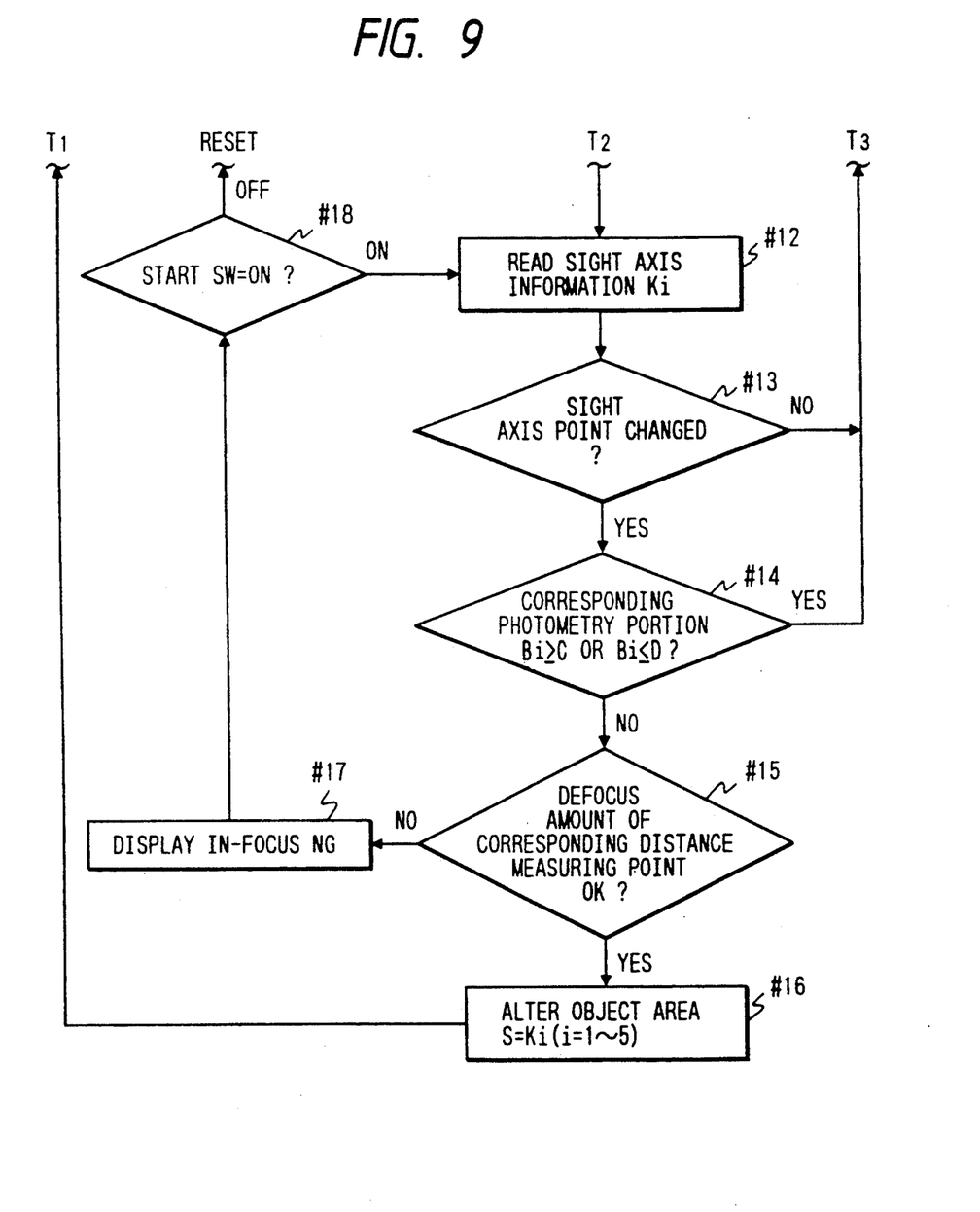
FIG. 9 is a flow chart showing an operation of the object judgement circuit according to the first embodiment of the present invention.

FIGS. 8 and 9 are flow charts of the first embodiment for judging an object area in the photographing frame by the object judgement circuit 108 thus representing one characteristic feature of the present invention.

In FIGS. 8 and 9, when an operation start switch (not shown) of the camera is turned on, the photometry output calculation circuit 103, the sight axis calculation circuit 105, and the distance measuring calculation circuit 107 (FIG. 4) respectively output photometry value information, sight axis position information, and defocus information of the distance measuring points, and the object judgement circuit 108 is started based on these pieces of information.

As the sight axis position information, one of the sight axis detection fields $K_1$ to $K_5$ is read (#1). In the first object judgement, an object area S is determined using the read sight axis position information alone as an initial value, and $S=K_i$ ($i=1$ to 5) is output (#2). The evaluation photometry calculation circuit 109 determines a weighted photometry portion $B_i$ corresponding to the object area $S=K_i$ (#3), performs the above-mentioned evaluated photometry calculation (#4), and displays the calculation result as a photometry value on a display unit (not shown) of the camera (#5).

Alternately with this operation, the distance measuring point selecting circuit 111 determines a distance measuring point $A_i$ corresponding to the object area $S=K_i$ (#6). The defocus amount of the determined distance measuring point is selected and output (#7), and the focusing ring of the photographing lens is driven to minimize the output defocus amount so as to attain an in-focus position (#8).

Upon completion of the photometry processing in steps #3 to #5 and the distance measuring processing in steps #6 to #8, the first distance measuring and photometry sequence is finished (#9).

It is then checked if a release switch (not shown) of the camera is depressed (#10). If YES in step #10, the release operation of the camera is performed, and a film is exposed with the predetermined exposure amount (#11). However, if NO in step #10, the flow advances to step #12, and one of the sight axis detection fields $K_1$ to $K_5$ is read as the sight axis position information, thus starting the second distance measuring and photometry sequence. It is checked in step #13 if the sight axis position is changed from the previous view point area.

More specifically, it is checked if the sight axis of the photographer is moved to another area. If NO in step #13, the flow returns to step #2, and the above-mentioned distance measuring and photometry sequence is repeated. However, if YES in step #13, the flow advances to step #14 to check if the luminance of the photometry portion $B_i$ corresponding to the changed sight axis detection field $K_i$ is equal to or higher than a predetermined luminance C or is equal to or lower than a predetermined luminance D. If YES in step #14, it is considered that the photographer watches an extremely bright area (ex. sun) or dark area (ex. shade, etc.), and it is determined that the main object is not moved or is changed. Thus, the flow returns to step #2 without altering the object area S determined in the previous sequence.

If NO in step #14, the flow advances to step #15, and a new distance measuring point $A_i$ corresponding to the sight axis detection field $K_i$ is checked to determine if the new distance measuring point is one extracted by the distance measuring calculation circuit 107 and representing a defocus amount at the closest-distance side of the closest-distance end of the photographing lens, i.e., falls within a possible driving range of the focusing ring. If OK is determined in step #15, it is determined that the object area S intended by the photographer is altered according to the sight axis position information, and the object area is altered to a new sight axis detection field $K_i$ (#16).

The flow returns to step #2 to judge the new object area, and the above-mentioned distance measuring and photometry sequence is executed using the new object area S, thereby determining the photometry value and the defocus amount of the distance measuring point in the new object area S.

However, if NG is determined in step #15, an in-focus display is caused to flicker as an NG display so as to generate an alarm for a predetermined period of time (#17), and it is then checked in step #18 if a start SW is ON. If it is determined in step #18 that the start SW is ON, the sight axis information is read again in step #12, and the above-mentioned object judgement sequence is repeated; otherwise, the camera is reset, and is set in an initial standby state until the next ON operation of the start SW.

As described above, in the object judgement sequence of this embodiment, even when the sight axis position is changed, when the photometry value of the changed area indicates an extremely high or low luminance, or when the distance measuring information indicates an extremely closest-distance position, it is determined that the photographer has not changed the object but he or she has taken a quick glance at another object, and the object area S has not been altered. At this time, the distance measuring and photometry sequence is executed again using the previous object area S.

Figure 10:
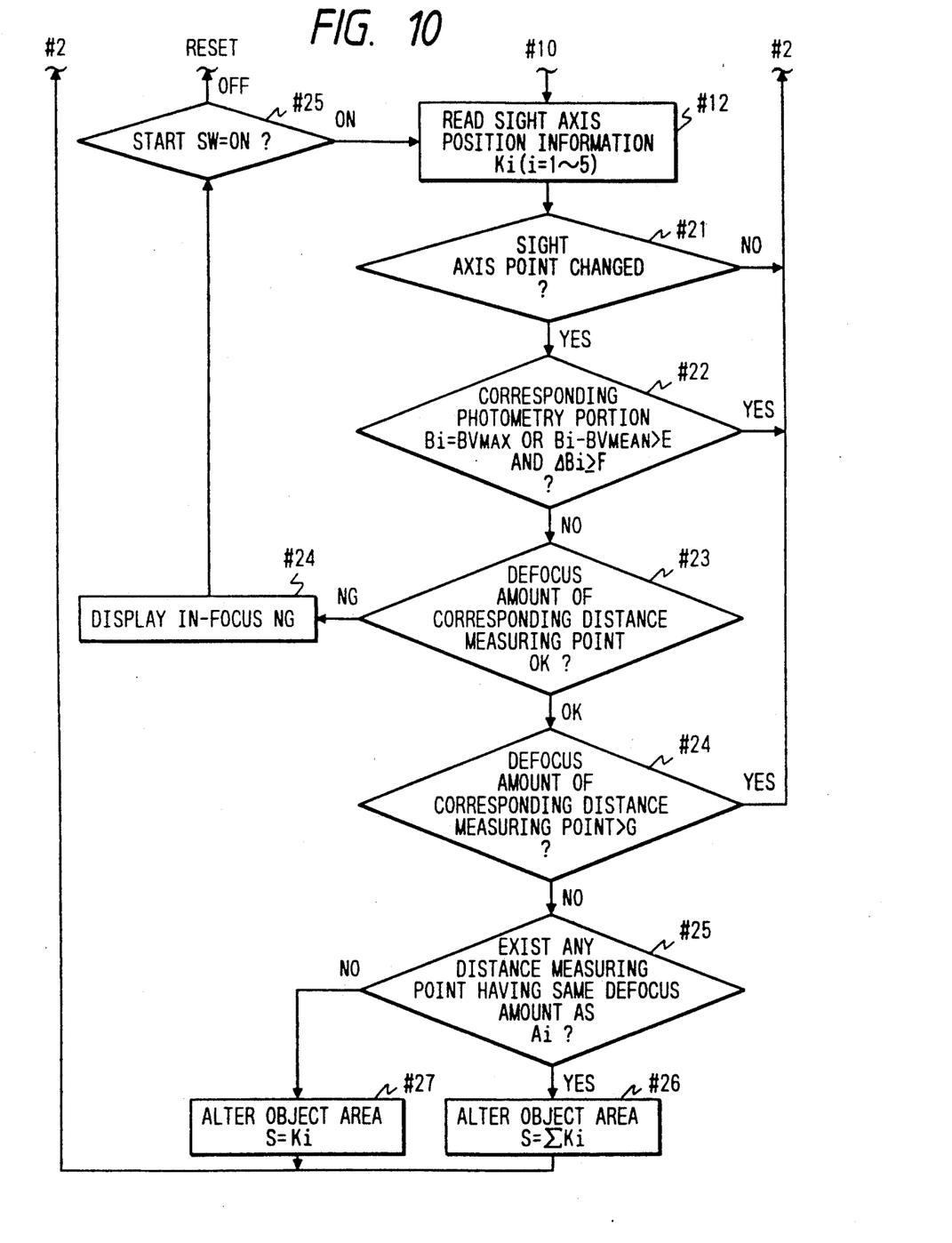
FIG. 10 is a flow chart showing an operation of an object judgement circuit according to the second embodiment of the present invention.

FIG. 10 is a flow chart of the second embodiment for selecting an object area in the photographing frame by the object judgement circuit 108 in the present invention.

Since steps associated with initial setting of an object area are the same as those in the flow chart of FIG. 8, a detailed description thereof will be omitted.

Upon completion of the first distance measuring and photometry sequence (#9), if it is determined that the release SW is not ON (#10), the second distance measuring and photometry sequence is started. If it is determined in step #21 that the sight axis position information is changed, the flow advances to step #22, and the photometry portion $B_i$ corresponding to the altered sight axis detection field $K_i$ is judged.

In this case, (1) It is checked if $B_i$ exhibits a maximum photometry value BVMAX of five photometry portions or $B_i$ is larger by a predetermined value E or more than a mean photometry value BVMEAN, and (2) it is checked if a difference $\Delta B_i$ between the photometry value in the previous corresponding photometry portion and the photometry value of the currently altered photometry portion is equal to or larger than a predetermined value F.

If $B_i$ satisfies both the conditions (1) and (2), since $\Delta B_i > F$, it is considered that an object has not moved but the photographer has altered an object which seems to be a main object. However, since $B_i$=BVMAX or $B_i$−BVMEAN>E, since the altered object area is extremely brighter than other object areas, it can be determined that, for example, the sun or a light source has simply drawn the photographer's attention.

Therefore, the flow returns to step #2 without altering the object area S, and the distance measuring and photometry sequence is executed using the previous object area. If either of the condition (1) or (2) is not satisfied, the flow advances to step #23, and a defocus amount $A_i$ of a distance measuring point corresponding to the altered sight axis detection field $K_i$ is checked as in step #15.

If NG is determined in step #23, an in-focus NG display is made (#24), as described above, and it is then checked if the start SW is ON (#25). In this manner, the sequence progresses as in steps #17 and #18 in the first embodiment.

If OK is determined in step #23, the flow advances to step #24, and if it is determined that the defocus amount of the altered corresponding distance measuring point $A_i$ is larger than a predetermined value G, it is considered that the photographer is watching an extremely close or far object as compared to the previous object. In this case, it is also determined that the object has not moved, and an object intended by the photographer has not been altered. The flow then returns to step #2 without changing the object area S.

If the defocus amount is smaller than the predetermined value G, it is determined that the object area S intended by the photographer has been altered according to the sight axis position information. In this embodiment, it is checked in step #25 if another distance measuring point having the same defocus amount as that of the corresponding distance measuring point $A_i$ exists. If YES in step #25, all distance measuring points having the same defocus amount and corresponding sight axis detection fields are determined as the object area (#26); otherwise, a single new object area is determined, and the object area S is altered to a new one.

The flow returns to step #2 as in the first embodiment, and the new object area is judged in place of the previous one. Then, the above-mentioned distance measuring and photometry sequence is executed using the new object area S. In this case, if a plurality of object areas are set in step #26, the weighting calculation portion weights a plurality of corresponding areas in step #3.

As described above, in the object judgement sequence of the second embodiment, even when the sight axis position is changed, when the photometry value of the altered area has a large difference from that of the previous area, and is extremely different from those of other areas, or when the distance measuring information indicates an extremely large defocus amount, it is determined that a main object has not moved or an object intended by the photographer has not been changed, but the photographer is watching, e.g., a background portion behind the object. Therefore, the object area S is inhibited from being altered, and the distance measuring and photometry sequence is executed using the previous object area S.

In this embodiment, the first judgement of the object area is performed based on the sight axis position information alone. In this case the object area is temporarily determined since an object intended by the photographer is not clearly determined immediately after the operation start SW of the camera is turned on. Alternatively, the object area may be judged based on both defocus information and photometry information at a distance measuring point from the beginning.

Figure 11:
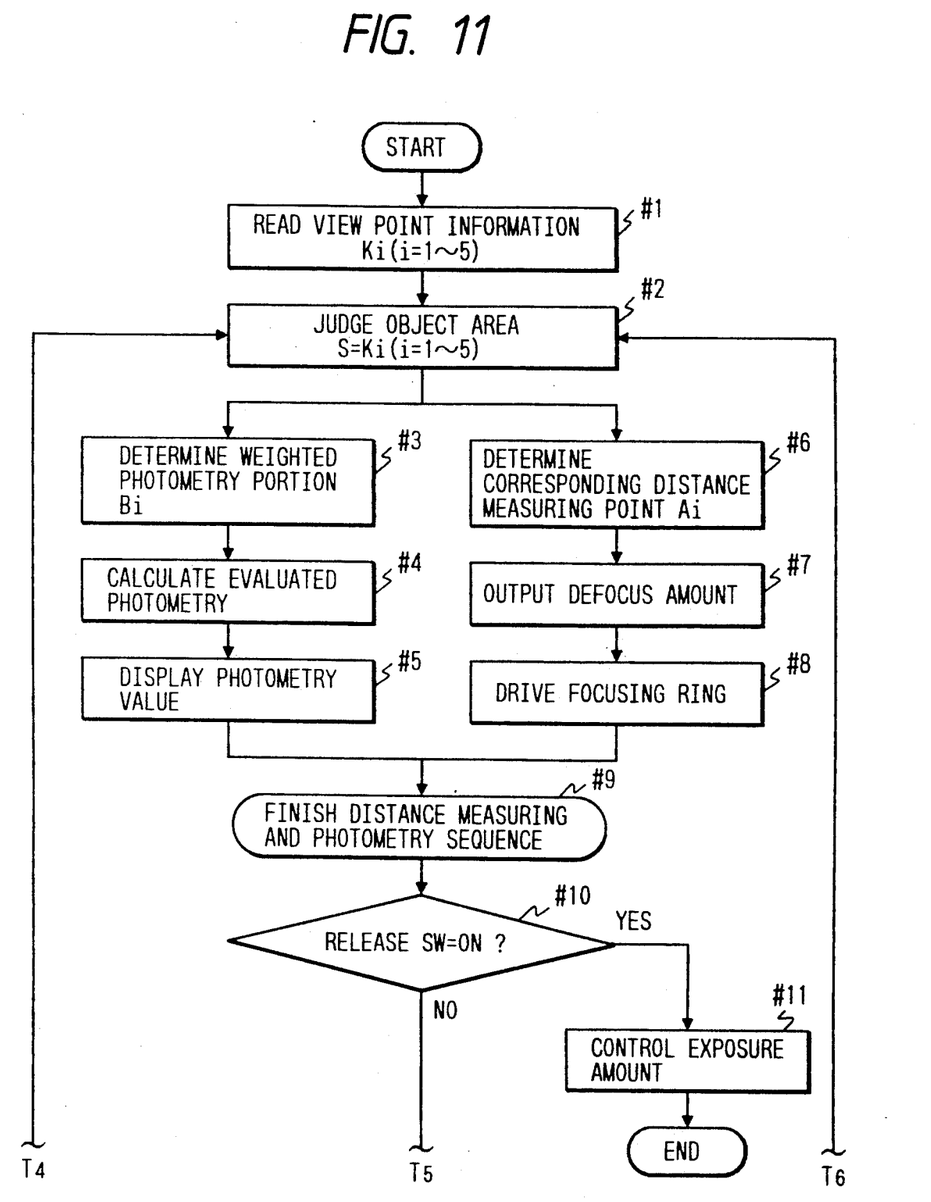
FIG. 11 is a flow chart showing an operation of an object judgement circuit according to the third embodiment of the present invention.
Figure 12:
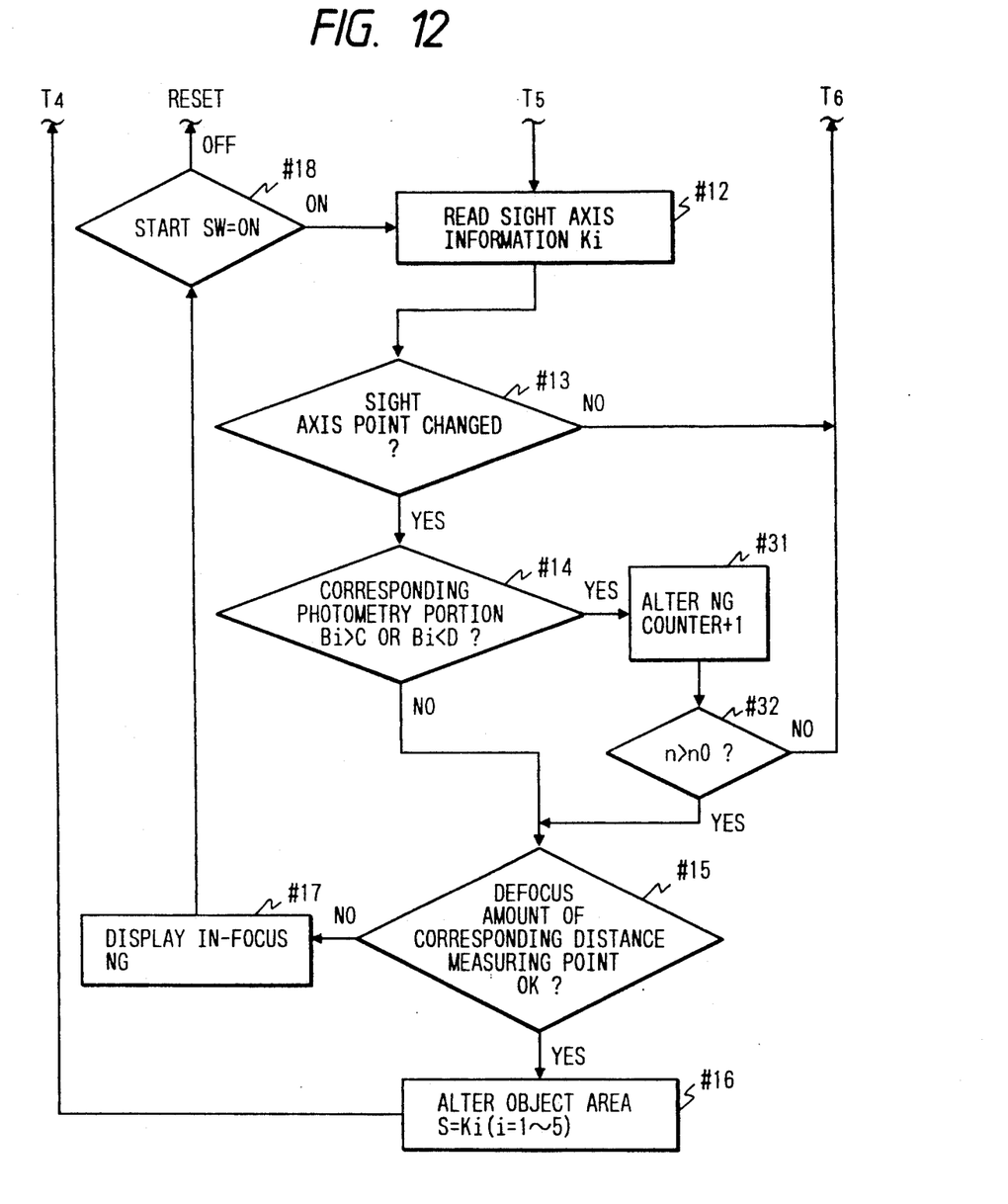
FIG. 12 is a flow chart showing an operation of the object judgement circuit according to the third embodiment of the present invention.

FIGS. 11 and 12 are flow charts of the third embodiment for selecting an object area in the photographing frame by the object judgement circuit 108 in the present invention.

In this embodiment, only differences from the first embodiment shown in FIGS. 8 and 9 will be described below.

As described above, it is checked in step #14 if the luminance of a photometry portion $B_i$ corresponding to the altered sight axis detection field $K_j$ is equal to or higher than a predetermined luminance C or is equal to or lower than a predetermined luminance D. If YES in step #14, the flow advances to step #31 without altering the object area S, and the content of an alter NG counter is incremented by one.

The alter NG counter is a counter which accepts second and subsequent count-up operations only when alter NG is successively determined. If NO in step #14, the counter is reset.

It is checked in step #32 if the content of the alter NG counter is larger than a predetermined count NO. If NO in step #32, the flow returns to step #2; otherwise, the flow advances to step #15 to check the defocus amount of the corresponding distance measuring point $A_i$. If OK is determined in step #15, it is determined that the object area S has been altered according to the sight axis position information, and the area S is altered to a new sight axis detection field $K_j$.

As described above, even when a photographer watches an extremely bright or dark area, if he or she does not take a quick glance at such an area but gazes at the area for a while, it is determined that the photographer does not want to alter an object, and the object area S is allowed to be altered again. Thus, judgement precision of an object intended by the photographer can be improved.

As described above, according to the present invention, an object in the frame is judged to select a distance measuring point using not only the sight axis position information of a photographer but also photometry information near the sight axis position. For example, when a photographer accidentally observes an extremely bright light source or an object having an extremely different luminance from those of other objects, the sight axis information obtained by the sight axis detection means is not used, and distance measuring points corresponding to these objects are not selected.

In this manner, the focusing lens of the photographing lens can be prevented from being unnecessarily driven, and a high-quality auto-focusing camera can be provided. In addition, since a photographing operation for a photographer can be facilitated, the photographer can concentrate on determination of a composition or a shutter chance, and the operability of the camera can be improved. Thus, a camera, which comprises the focus detection means and the sight axis detection means and has the above-mentioned effects, can be achieved.

What is claimed is:

1. A focus adjustment apparatus for an objective lens, comprising:
   detection means for detecting a view point of an observer;
   photometry means for measuring luminances at a plurality of positions in a field; and
   selection means for selecting an area to be subjected to focus adjustment of said objective lens on the basis of a detection signal from said detection means and a photometry signal from said photometry means.

2. An apparatus according to claim 1, wherein when a photometry value, measured by said photometry means, of an area corresponding to the view point detected by said detection means falls within a predetermined value range, said selection means selects the area corresponding to the detected view point.

3. An apparatus according to claim 1, further comprising execution means for executing focus adjustment according to the area selected by said selection means.

4. An apparatus according to claim 2, further comprising execution means for executing focus adjustment according to the area selected by said selection means.

5. An apparatus according to claim 1, wherein when a photometry value, measured by said photometry means, of an area corresponding to the view point detected by said detection means is not less than a predetermined value, said selection means selects an area other than the area corresponding to the detected view point.

6. An apparatus according to claim 1, wherein when a photometry value, measured by said photometry means, of an area corresponding to the view point detected by said detection means is not more than a predetermined value, said selection means selects an area other than the area corresponding to the detected view point.

7. An apparatus according to claim 1, further comprising a focus state detection device for detecting focus adjustment states at a plurality of positions for said objective lens, and wherein said selection means selects the area also on the basis of a focus detection signal from said focus state detection means.

8. An apparatus comprising:
   detection means for detecting a view point of an observer;
   photometry means for measuring luminances at a plurality of positions in a field; and
   inhibition means for, when a photometry output from said photometry means is abnormal, inhibiting setting of an area corresponding to the view point detected by said detection means.

9. An apparatus according to claim 8, wherein when the photometry output is high, said inhibition means inhibits setting of the area.

10. An apparatus according to claim 8, wherein when the photometry output is low, said inhibition means inhibits setting of the area.

* * * * *

UNITED STATES PATENT AND TRADEMARK OFFICE
CERTIFICATE OF CORRECTION

PATENT NO. : 5,296,888
DATED : March 22, 1994
INVENTOR(S) : Akira YAMADA

It is certified that error appears in the above-indentified patent and that said Letters Patent is hereby corrected as shown below:

ON THE TITLE PAGE

At [57], Under Heading "ABSTRACT":
Line 7, "field," should read --field--.

COLUMN 7:
Line 38, "changes," should read --changes--.

COLUMN 9:
Line 55, "It" should read --it--.

Signed and Sealed this

Fifteenth Day of November, 1994

Attest:

BRUCE LEHMAN

*Attesting Officer*       *Commissioner of Patents and Trademarks*